United States Patent [19]

Weisel et al.

[11] Patent Number: 5,048,570
[45] Date of Patent: Sep. 17, 1991

[54] MULTISECTIONED NOZZLE DAM

[75] Inventors: Eric M. Weisel, Windsor Locks; Glen E. Schukei, South Windsor, both of Conn.

[73] Assignee: Combustion Engineering Inc., Windsor, Conn.

[21] Appl. No.: 854,359

[22] Filed: Apr. 21, 1986

[51] Int. Cl.⁵ .............................................. F16L 55/12
[52] U.S. Cl. ........................................ 138/93; 376/204
[58] Field of Search ............................ 138/89, 90, 93; 376/204; 220/232

[56] References Cited

U.S. PATENT DOCUMENTS

| | | | |
|---|---|---|---|
| 759,081 | 5/1904 | Delehanty | 220/327 |
| 2,921,608 | 1/1960 | Crawford et al. | 138/89 |
| 3,844,313 | 10/1974 | Arnold | 138/90 |
| 3,929,253 | 12/1975 | Johnsson | 277/236 X |
| 4,068,852 | 1/1978 | Anglade | 277/208 X |
| 4,470,946 | 9/1984 | Vassalotti et al. | 138/90 X |
| 4,624,465 | 11/1986 | Rogemont | 277/2 X |

Primary Examiner—Henry J. Recla
Attorney, Agent, or Firm—John H. Mulholland

[57] ABSTRACT

A multisectioned nozzle dam (30) for use in a steam generator (24) with an integral bolt ring (32) has a body structure of general circular shape. Redundant seals including at least three separate inflatable peripheral seals (48, 50 and 52) with an alarm (A) for indicating a pressure increase between the second and third seals (50 and 52) is provided. Redundant supports including a plurality of independent bars (60, 62, 64 and 66) bolted to the integral bolt ring (36) secure the dam (30) within the nozzle (26) to the appropriate axial position.

4 Claims, 4 Drawing Sheets

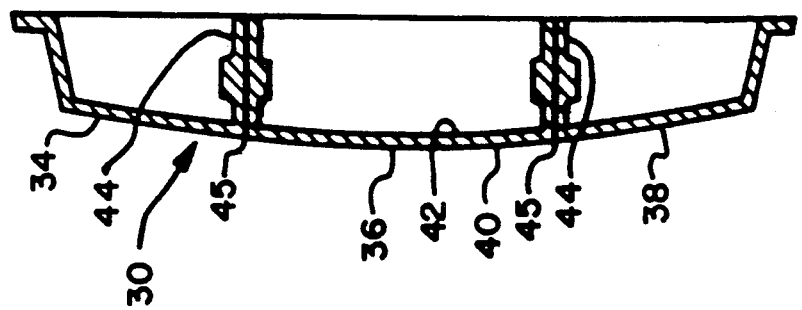
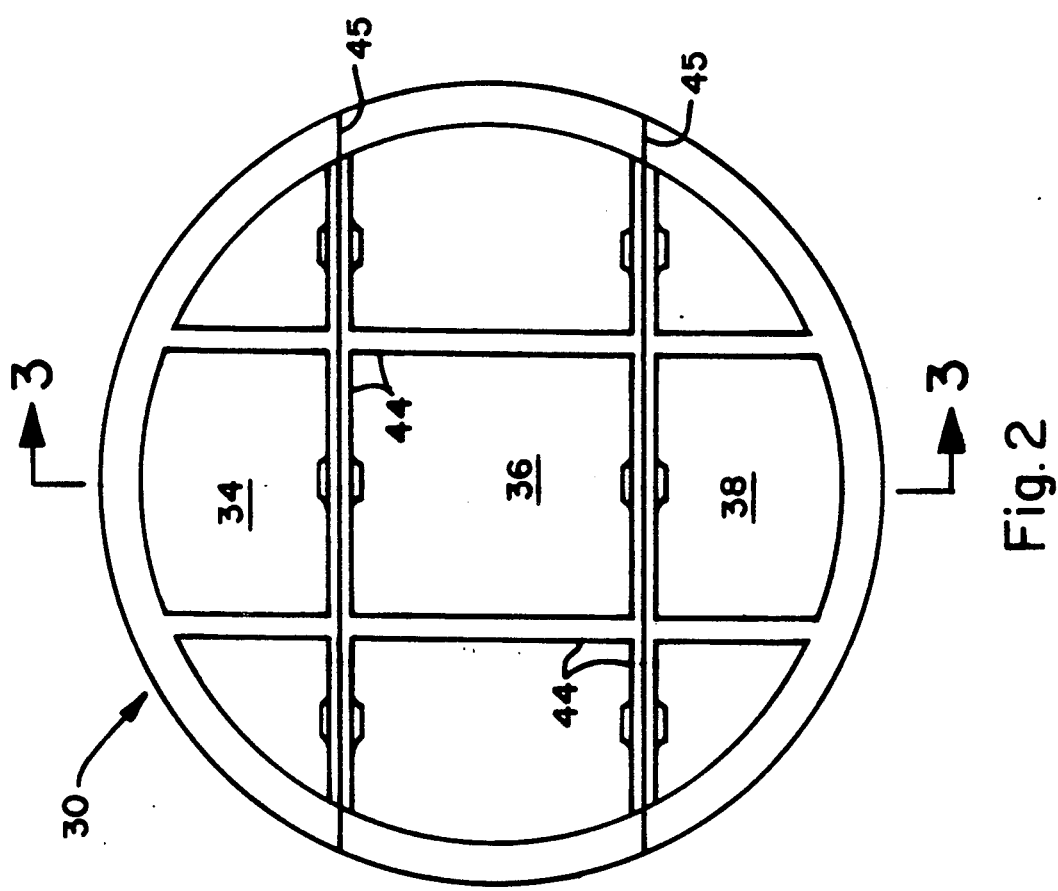

MULTISECTIONED NOZZLE DAM

FIELD OF THE INVENTION

The present invention relates to an improvement in nozzle dams for steam generators of the type having an integral bolt ring. The steam generators are in association with a conventional nuclear power generating system. Nozzle dams are used to provide a temporary liquid tight seal in a nozzle of a steam generator.

BACKGROUND OF THE INVENTION

To employ a plug to affect blockage of a normally open flow passage for repair purposes has been known in the prior art in connection with many types of fluid flow systems. Examples of expansible plugs or dams of the prior art may be found in U.S. Pat. Nos. 2,843,154; 3,834,422; and, U.S. Pat. No. 4,518,015. From these concepts, which are generally applicable to flow passageways, nozzle plugs for steam generators of conventional nuclear power generating systems have developed. An example of such a nozzle plug for effecting a temporary blockage of a passage into or out of a nuclear power system steam generator will be found in U.S. Pat. No. 4,482,076 to Timothy H. Wentzell, assigned to Combustion Engineering, Inc., the assignee of the instant invention.

Periodically, there arises a need to conduct maintenance on and/or to effect minor repairs, of the internal components of the steam generator. To accomplish such tasks, it is necessary for one or more persons to physically enter the steam generator. Ingress and egress to and from the steam generator by such persons is accomplished through suitable means such as, for example, an access port or manway. While such persons are working in the steam generator, it is desirable that a blockage of the inlet and outlet nozzle of the steam generator be effected to ensure that there will be no fluid flow through the steam generator which might physically imperil the people working therein.

One such design of a nozzle plug for a nuclear steam generator is disclosed in the U.S. Pat. No. 4,482,076 mentioned above. In that design a plurality of plate sections are assembled within the steam generator to form the plug or nozzle dam. U.S. Pat. No. 4,483,457 to Schukei and Tade discloses an improvement over the Wentzell patent in that it provides for the sections of the nozzle dam to be hinged together.

SUMMARY OF THE INVENTION

The present invention relates to an improved steam generator nozzle dam for installation in a steam generator nozzle so that protrusions will not interfere with repair operations inside of the steam generator. The nozzle has been designed so that no holes need be drilled in the nozzle itself and its adjustable support system will permit variation of the axial location of the nozzle dam in the nozzle.

A particular advantage in the improved nozzle dam of this invention is the fact that the mechanical support system and the seal system provide redundancy for safety of the personnel doing repair work in the steam generator. This is accomplished so that pool and flow passage water levels may be maintained to permit simultaneous reactor refueling and steam generator inspection and repair operations. This arrangement, accordingly, has the potential to result in significant savings in downtime for maintenance of a nuclear power generating system.

The improved multisectioned nozzle dam for use according to the invention has a body structure with a circular periphery, a primary pressure receiving side and a secondary side. The primary pressure receiving side is mounted in the nozzle in the direction of the reactor. A redundant seal means is provided which includes at least three separate inflatable peripheral seals, a primary side flexible diaphragm and a flexible interface seal between the various dam sections. A redundant support means is provided which includes a plurality of independent bars bolted to the ring and engaging the secondary side.

The improved multisectioned nozzle dam defines a dome on its primary side and may be provided with a pressure sensing means to sense pressure increases between the second and the third redundant inflatable seals. A pressure sensitive alarm means is actuated when the pressure sensing means senses an undesirably increased pressure. Because of the presence of three independently inflatable seals on the dam periphery, even if the alarm is actuated, the third seal will still provide safety for anyone working in the steam generator.

It is, therefore, an object of the present invention to provide an improved multisectioned nozzle dam for isolating a steam generator from a nuclear reactor without the necessity of drilling holes in the nozzle surface and without creating a significant protrusion into the generator interior.

It is a further object of the present invention to provide an improved multisectioned nozzle dam of a structure which includes redundant seal means and redundant mechanical support means.

BRIEF DESCRIPTION OF THE DRAWINGS

FIG. 2 is a side elevational view of the secondary side of the multisectioned nozzle dam body.

FIG. 3 is a cross-sectional elevational view taken along the line 3—3 of FIG. 2.

DETAILED DESCRIPTION OF THE PREFERRED EMBODIMENT

Figures 1, 1A:
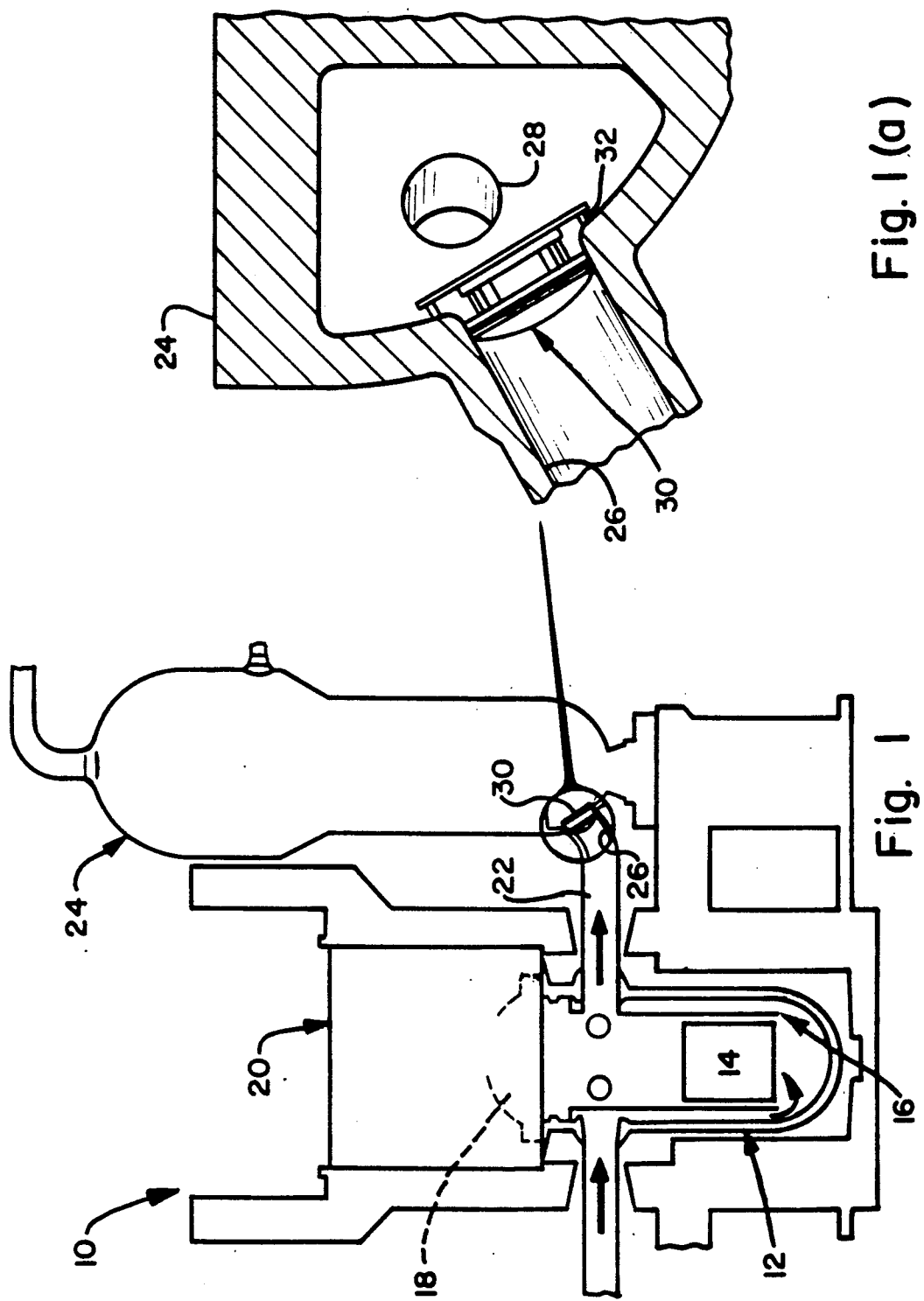
FIG. 1 is a schematic elevational view of a nuclear steam generator system of conventional type wherein the improved multisectioned nozzle dam of the invention is illustrated in a partially broken away circular area.
FIG. 1A is an expanded view of the encircled area of FIG. 1.
Figure 4:
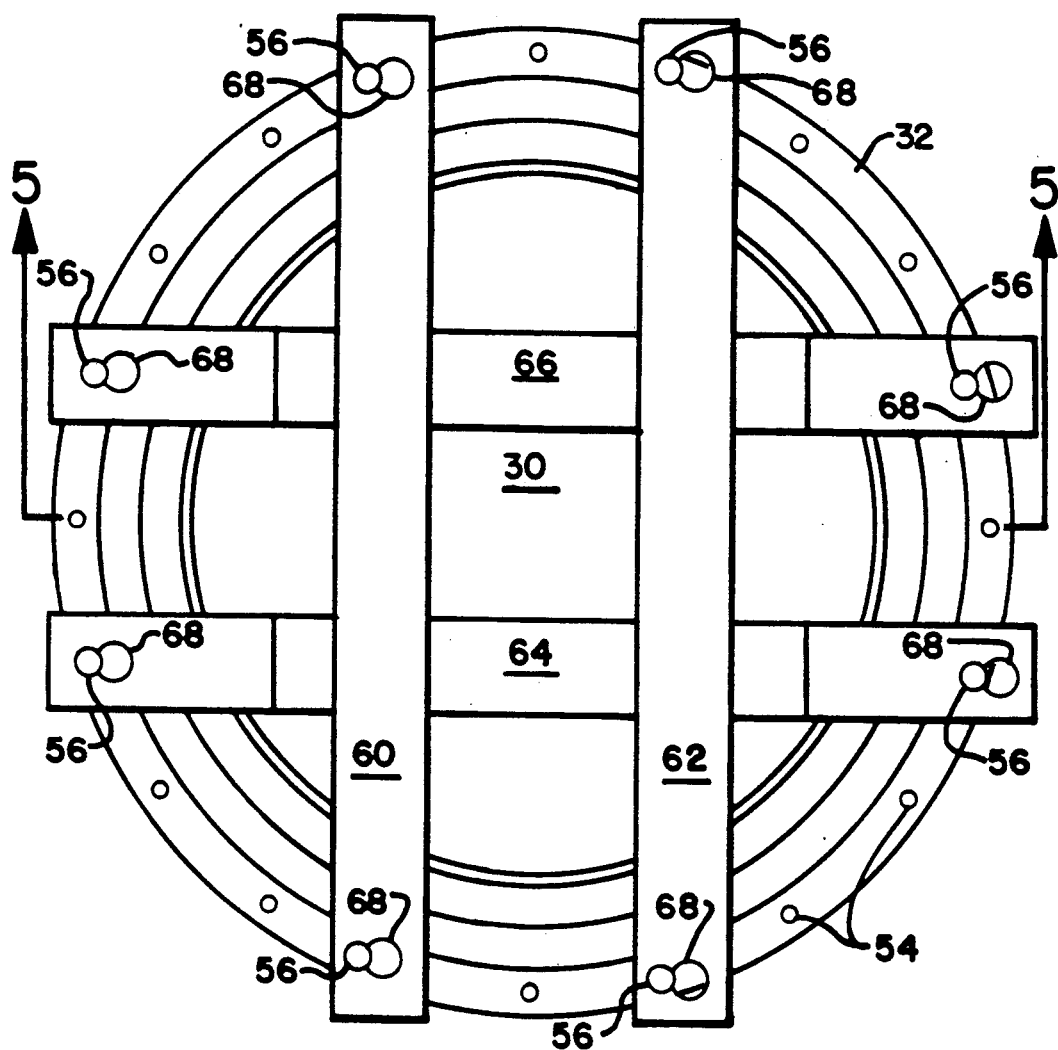
FIG. 4 is a side elevational view similar to FIG. 2 with the improved multisectioned nozzle dam mounted in the nozzle of a steam generator having an integral bolt ring.

A conventional type of nuclear power generating system is schematically illustrated in FIG. 1 and generally designated by the numeral 10. The system 10 includes a reactor vessel 12 and a core 14 surrounded by a core support barrel 16. System 10 is shown with a closure head 18 removed but illustrated in phantom at the top of the reactor vessel 12. This is because the system 10 is shown in FIG. 1 in a condition which includes the provision of a refueling pool 20 for protection against radiation of the reactor core. The refueling pool 20 creates a head of pressure in the flow passageway 22 which communicates the reactor vessel 12 with a steam generator 24 through a nozzle 26. The steam generator 24 has a manway 28 provided therein to permit ingress and egress by a repair person.

The improved multisectioned nozzle dam of the invention is generally designated by the numeral 30. The dam 30 is attached to the steam generator by means of the generator's integral bolt ring 32 surrounding the nozzle 26. The nozzle dam 30 includes sections 34, 36 and 38, respectively, as shown in FIG. 2, which define a body of circular shape having a domed primary side 40 and concave secondary side 42 including rigidifying members 44. The rigidifying members 44 are substantially transverse to the primary and secondary sides of the sections or segments 34, 36 and 38. The dam 30 is constructed using these segments or sections, in order for it to be conveniently passed through the manway 28 prior to assembly into the circularly shaped dam 30. The surfaces of the sections 34, 36, and 38, and their members 44, which come in face-to-face contact, are provided with seal means 45 in the form of a sealing material of suitable elastomeric material.

A flexible diaphragm part of the seal means is of similar material and is designed to slip into place over the assembled dam just prior to the start of the dam into the nozzle bore. The diaphragm 46 includes three independently and separately inflatable annular seals 48, 50 and 52 which provide a safe redundant seal means around the periphery of the nozzle dam 30. This ensures that contaminated refueling pool water from a pool 20 will be isolated from the inside of the steam generator 24 in a manner in which the multisectioned nozzle dam 30, made of a rigid aluminum material, would not otherwise provide. The body or circular portion of the aluminum dam structure 30 enters the taper of nozzle 26 until it is stopped. This sets the clearances around the periphery for optimum sealing and also forms a secondary leak limiting seal if all inflatable seals fail.

The integral bolt ring 32 which surrounds the nozzle 26 has a plurality of bolt holes 54 about its circumference to which independent bars 60, 62, 64 and 66 are bolted by means of bolts 56. Each bar of the support structure 60, 62, 64 and 66, respectively, is provided with a keyhole slot 68 at either end to fit over and lock onto and behind the installed bolts 56.

This provides a redundant structural support such that if the support beams 60, 62 fail, the beams 64, 66 will provide adequate support.

The use of bolts 56 and keyhole slots 60 allows installation of the dam, even though bolts 56 are installed and locked into place so that they need not be removed for each use. Elongated members 70 extend from each bar 60, 62, 64 and 66 to the ribs 44 on the secondary side of the dam with two contact points on the dam from each of the bars. This arrangement causes the dam structure to be loaded in an essentially compressive mode. The members 70 may be made adjustable in length. This allows the distance from the dam 30 to the backup structure formed by bars 60, 62, 64 and 66 to be a variable, since the diameter of the nozzle is not accurately known in advance.

The segments 34, 36 and 38 are pinned and clamped in known manner into the assembled dam 30 prior to its insertion in the nozzle 26. This multisegmented structure allows the nozzle dam 30 to be transferred through the 16 inch manway opening 28.

An extensive test program has been performed to verify the structural adequacy of a dam and to demonstrate the sealing capabilities of the seal design. The test set up was a cladded nozzle 26 that was used to test the first prototypical dam. The dam was hydrostatically tested in 80 feet water, which is well above the specified design head of 40 feet of the fueling pool 20. The complex dam structure was instrumented with strain gages located at critical areas determined from structural analysis. The results from this qualification test showed that the dam structure could withstand the design conditions with comfortable margins of safety. The seal was shown to perform without leakage operating in the geometry which replicated the nozzle bore.

Figure 5:
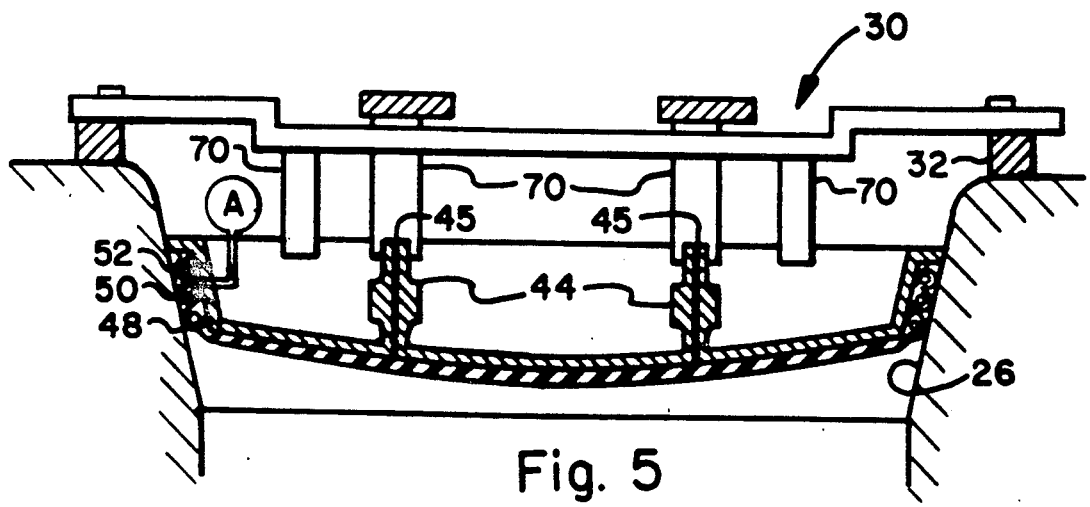
FIG. 5 is a cross-sectional view taken along the lines 5—5 of FIG. 4 with the sealing diaphragm in place.
Figure 6:
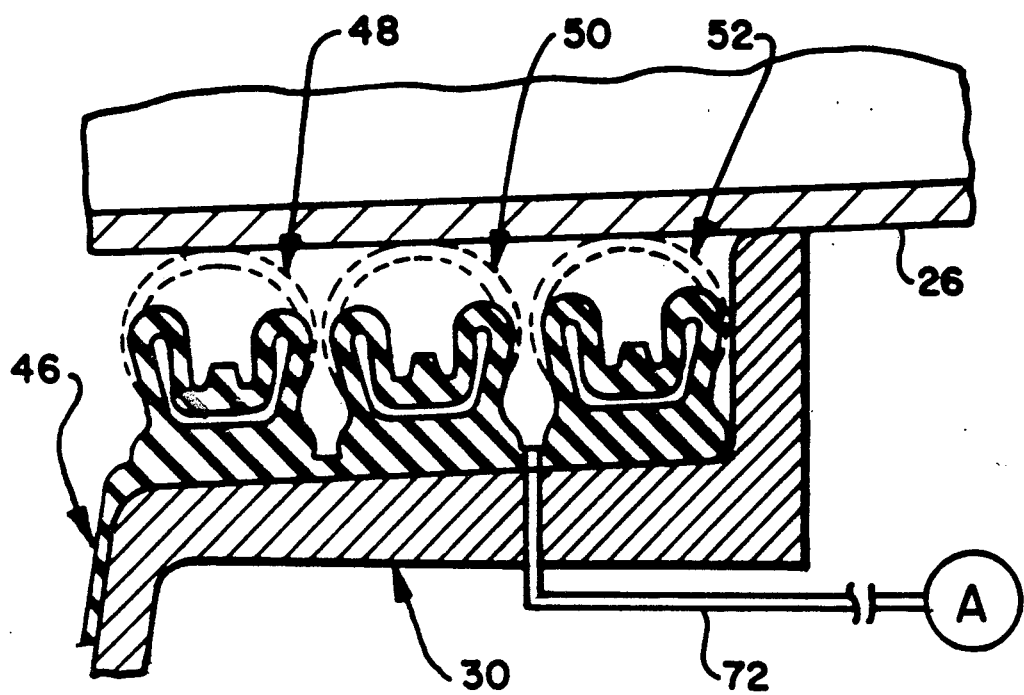
FIG. 6 is a schematic enlarged cross-sectional view of a portion of FIG. 5 showing the seal means and alarm means.

The isolation redundancy provided by the continuous flexible diaphragm 46, with its three independently inflatable seals 48, 50 and 52 mounted in parallel on its periphery, is in keeping with the safety concept of the design. The peripheral seals are actuated by internal pressure which expands the seal radially against the inside diameter surface of the nozzle 26. The second and outermost seals 50 and 52 provide standby protection in the event, either the first seal 48 should lose its internal seal pressure, or, a surface imperfection in the nozzle 26 is present which would permit flow past the innermost seal 48. A leak detection line 72 is located between the second seal 50 and the outermost seal 52 and a leak detection alarm (A) is mounted in the pressure control panel, as shown schematically in FIGS. 5 and 6.

Each dam has a valve harness with quick disconnects to speed installation and check valves to keep the seals pressurized if air supply is lost. For clarity of illustration, this structure is not shown. In addition to this, a pressurization system is normally supplied by plant instrument air and this is backed by a nitrogen supply that comes on-line automatically if the instrument air is lost. The connection from the pressure control system to the dam is by separate air lines to each seal on the dam. The air lines are typically one-quarter inch diameter of polytetrafluoroethylene with a stainless steel braid cover.

We claim:

1. An improved multisectioned nozzle dam for use in a steam generator with an integral bolt ring, said nozzle dam being useful for isolating the generator without the necessity of drilling holes in the nozzle surface and without creating a significant protrusion into the generator interior and including in combination;
   a body having a generally circular periphery, a primary pressure receiving side and a secondary side,
   redundant means of elastomeric material for sealing including at least three separate inflatable peripheral seals, a primary side flexible diaphragm and a flexible section interface seal,
   redundant means for support including a plurality of independent bars having means for facilitating their being bolted to the ring and engaging the secondary side.

2. The improved multisectioned nozzle dam of claim 1 in which the primary side of the body defines a dome.

3. The improved nozzle dam of claim 2 in which a means for pressure sensing senses pressure increases between the second and third inflatable seals.

4. The improved nozzle dam of claim 3 in which a pressure sensitive means for alarming is actuated when the means for pressure sensing senses an undesirably increased pressure.

* * * * *